United States Patent
Higuchi et al.

(10) Patent No.: US 7,419,229 B2
(45) Date of Patent: Sep. 2, 2008

(54) VEHICLE BRAKING FORCE CONTROL

(75) Inventors: Takuya Higuchi, Tokyo (JP); Takeshi Ishimoto, Kanagawa (JP); Tatsuya Suzuki, Kanagawa (JP); Masahide Nakamura, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 384 days.

(21) Appl. No.: 11/144,610

(22) Filed: Jun. 6, 2005

(65) Prior Publication Data

US 2005/0269876 A1 Dec. 8, 2005

(30) Foreign Application Priority Data

Jun. 7, 2004 (JP) .............................. 2004-167909

(51) Int. Cl.
*B60T 8/60* (2006.01)
*B60T 13/74* (2006.01)

(52) U.S. Cl. .................. 303/155; 303/15; 303/158; 701/70

(58) Field of Classification Search .............. 303/3, 303/15, 155, 191, 167, 158, DIG. 1, DIG. 2; 701/70, 72, 78, 83
See application file for complete search history.

(56) References Cited

U.S. PATENT DOCUMENTS 5,564,797 A * 10/1996 Steiner et al. ............ 303/113.4
5,727,852 A    3/1998 Pueschel et al.
5,762,407 A *  6/1998 Stacey et al. .............. 303/155
6,192,307 B1 * 2/2001 Okamoto et al. ............ 701/70
6,278,930 B1 * 8/2001 Yamada et al. .............. 701/82
6,464,307 B1 * 10/2002 Yoshino ....................... 303/11

FOREIGN PATENT DOCUMENTS

| DE | 195 01 760 A1 | 7/1996 |
| DE | 100 65 239 A1 | 8/2001 |
| DE | 100 57 279 A1 | 6/2002 |
| JP | 05-016699 A   | 1/1993 |
| JP | 2600876 B2    | 1/1997 |

OTHER PUBLICATIONS

U.S. Appl. No. 11/143,573, filed Jun. 3, 2005, Ishimoto.
U.S. Appl. No. 11/136,312, filed May 24, 2005, Struck.

* cited by examiner

*Primary Examiner*—Melody M Burch
(74) *Attorney, Agent, or Firm*—Foley & Lardner LLP

(57) ABSTRACT

A vehicle brake control apparatus controls an actual braking force of a vehicle to achieve a command braking force in accordance with a driver's demand braking force corresponding to a driver's braking operation, and a target braking force. A controller is configured to calculate a time rate of change of the target braking force; to calculate a time rate of change of the demand braking force; and to calculate the command braking force in the control mode in accordance with the time rate of change of the demand braking force and the time rate of change of the target braking force.

12 Claims, 4 Drawing Sheets

VEHICLE BRAKING FORCE CONTROL

BACKGROUND OF THE INVENTION

The present invention relates to apparatus and/or process for controlling a braking force of a vehicle automatically without regard to a driver's brake operation.

A Japanese patent 2600876 (JP-A-H02-171373) shows an automatic brake control system for producing a braking force automatically when a vehicle turning speed becomes close to a limit of a stable cornering operation range.

SUMMARY OF THE INVENTION

However, an automatic braking force control system may be unable to respond to a driver's brake input properly in some cases, and may decrease a vehicle deceleration, causing unnatural feeling in a driver depressing a brake pedal in expectation of an increase of the vehicle deceleration. When, for example, a control system is arranged to control the actual vehicle braking force by a select-high operation selecting a greater one of an automatic target braking force and a driver's demand braking force, the vehicle deceleration can be decreased despite a driver's pedal operation of depressing a brake pedal, if the braking force produced by the automatic control is in a decreasing state, and the absolute value of the braking force produced by the automatic control is greater than the braking force produced by the braking operation. Furthermore, a brake control system arranged to control the vehicle braking force by addition of the automatic target braking force and the driver's demand braking force is operated to decrease the vehicle deceleration despite a driver's depression of the brake pedal if a decrease quantity of the braking force by the automatic brake control is greater than a decrease quantity of the braking force produced by the brake pedal operation.

It is therefore an object of the present invention to provide vehicle braking force control apparatus and/or process for improving brake control performance so as to improve driver's feeling.

According to one aspect of the present invention, a vehicle brake control apparatus comprises: a controller to control an actual braking force of a vehicle to achieve a command braking force. The controller is configured to determine a driver's demand braking force corresponding to a driver's braking operation of the vehicle; to calculate a target braking force independent of the driver's braking operation, to control the actual braking force of the vehicle in a brake control mode in a predetermined vehicle running state; to calculate a time rate of change of the target braking force; to calculate a time rate of change of the demand braking force; and to calculate the command braking force in the control mode in accordance with the time rate of change of the demand braking force and the time rate of change of the target braking force.

According to another aspect of the invention, a vehicle brake control process of controlling an actual braking force of a vehicle, comprises: a first process element of controlling the actual braking force of the vehicle to achieve a command braking force; a second process element of calculating a driver's demand braking force in accordance with a sensed driver's brake operation quantity; a third process element of calculating a target braking force for the automatic brake control when a predetermined running state is present; a fourth process element of calculating a time rate of change of the demand braking force; a fifth process element of calculating a time rate of change of the target braking force; and a sixth process element of calculating the command braking force in accordance with the time rate of change of the demand braking force, and the time rate of change of the target braking force. The process may further comprises a process element of examining whether the predetermined vehicle running state to trigger an automatic brake control is present.

According to still another aspect of the present invention, a vehicle brake control apparatus comprises: first means for controlling the actual braking force of the vehicle to achieve a command braking force; second means for calculating a driver's demand braking force in accordance with a driver's brake operation; third means for calculating a desired target braking force independent of the driver's brake operation, to control the actual braking force in a control mode when a predetermined vehicle running state is detected; and fourth means for calculating the command braking force in accordance with the target braking force and the demand braking force so that the command braking force is not made smaller than the target braking force, and for calculating the command braking force by using a previous value of the command braking force and an increase rate of the demand braking force so as to increase a deceleration of the vehicle in response to the driver's brake operation when the demand braking force is increased in the control mode.

DETAILED DESCRIPTION OF THE INVENTION

Figure 1:
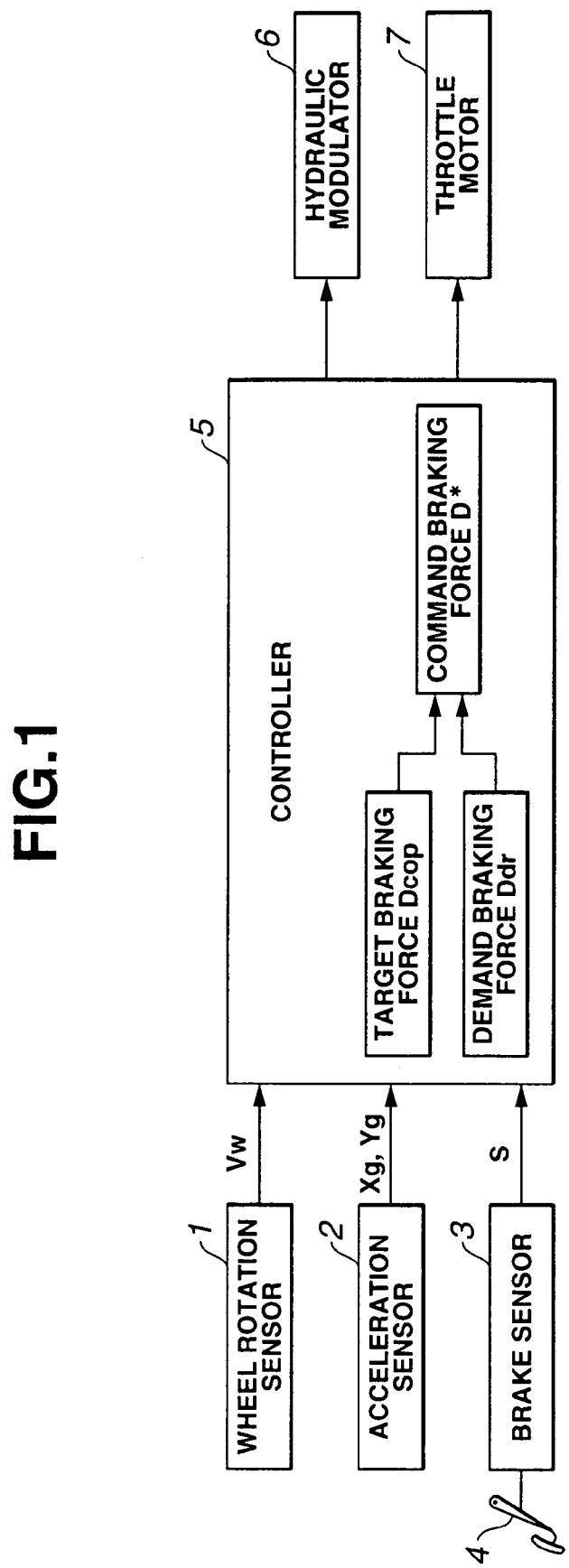
FIG. 1 is a block diagram showing a vehicle braking force control system or apparatus according to one embodiment of the present invention.

FIG. 1 shows, in a block diagram, a vehicle braking force control apparatus according to one embodiment of the present invention. A wheel rotation sensor (or wheel speed sensor) 1 is a group of sensing devices for sensing wheel speeds Vwfl~Vwrr of the front and rear wheels of a vehicle, respectively. An acceleration sensor 2 includes one or more sensing devices for sensing a longitudinal acceleration Xg and a lateral acceleration Yg of the vehicle. A brake sensor 3 senses a driver's brake operation quantity S of a brake pedal 4 of the vehicle. A sensor section including these sensors is connected with a controller 5 which includes a microcomputer in this example. Input information collected by the sensor section is supplied to controller 5.

Figure 2:
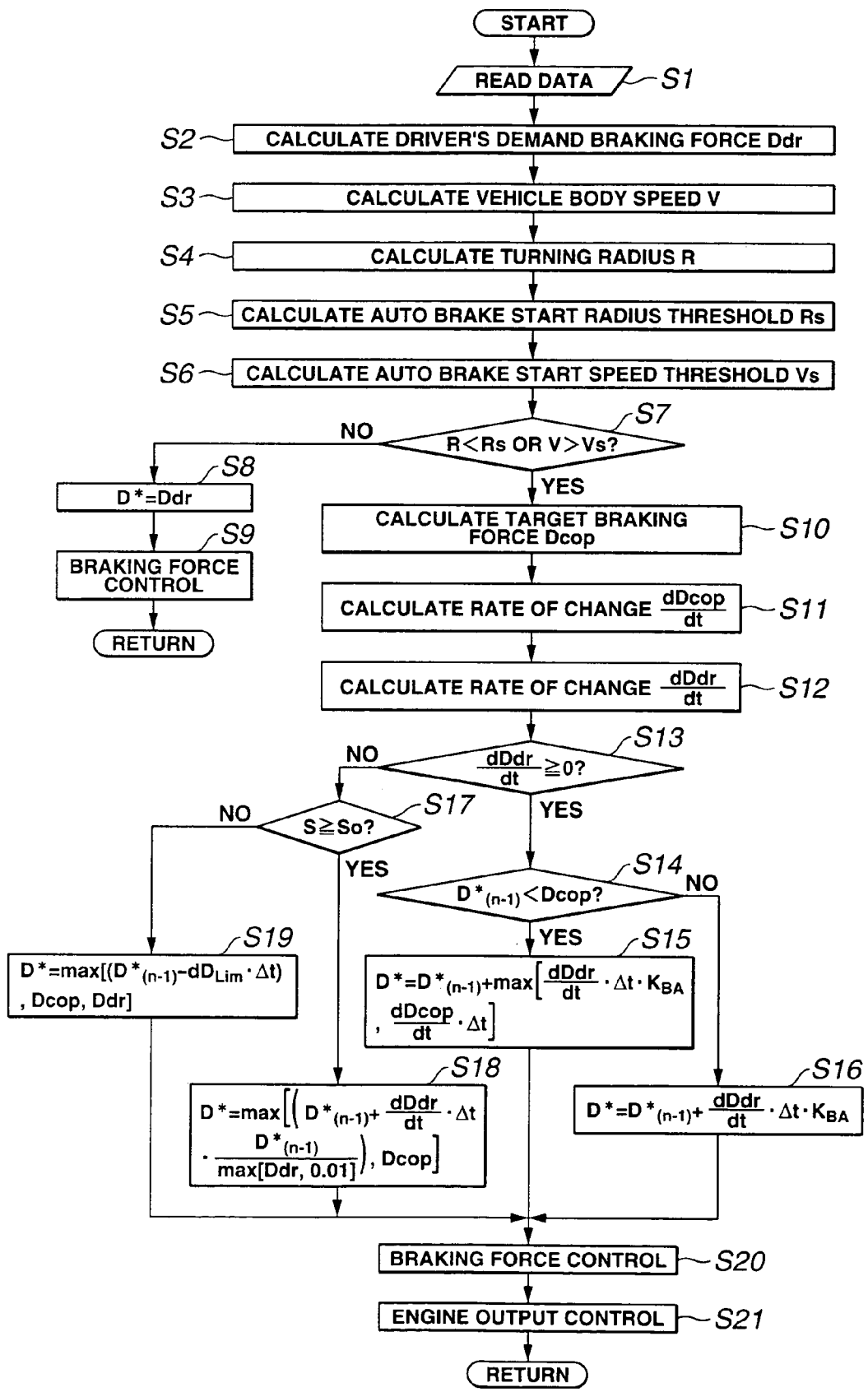
FIG. 2 is a flowchart showing a vehicle braking force control process performed by a controller of the control system shown in FIG. 1.

Controller 5 performs a braking force control process (as shown in FIG. 2) by using the signals supplied from the sensors, and thereby controls an actuating section which, in this example, includes a brake actuating system (or brake actuator) including a hydraulic modulator (or oil pressure producing device) 6 for supplying desired brake fluid pressures to wheel cylinders of the wheels, and a throttle actuator (motor, in this example) 7 for regulating an opening degree of a throttle valve for an engine of the vehicle. Normally, controller 5 controls hydraulic modulator 6 in a normal mode so as to produce the braking force in accordance with the driver's brake operation quantity S. In the case of an automatic deceleration control mode (or brake control mode) responsive to a turning condition of the vehicle, controller 5 controls hydraulic modulator 6 so as to produce the braking force desirable for stable cornering operation of the vehicle, and controls throttle motor 7 so as to achieve an optimum engine output.

FIG. 2 shows the braking force control process performed by controller 5 at regular time intervals of a predetermined time (10 msec, in this example) as timer interrupt routine.

At step S1, controller 5 reads the wheel speeds Vwfl~Vwrr, longitudinal acceleration Xg, lateral acceleration Yg, and brake operation quantity S. Then, at step S2, controller 5 calculates a demand braking force Ddr representing a braking force demanded by the driver, from the driver's brake operation quantity S. At next step S3, controller 5 calculates a vehicle body speed V. In this example, vehicle body speed V is determined by a select-high operation of the wheel speeds Vwfl~Vwrr and an integral of longitudinal acceleration Xg.

At step S4 following S3, controller 5 calculates a vehicle turning radius R from the vehicle body speed (hereinafter referred to as turning speed) V and the lateral acceleration Yg according to the following equation (1).

$$R = V^2/Yg \tag{1}$$

In this example, vehicle turning radius R is calculated from turning speed V and lateral acceleration Yg. However, the method of calculating turning radius R is not limited to this. It is optional to calculate the vehicle turning radius R by taking account of a steering angle θ and/or a yaw angular acceleration ψ. For example, turning radius R can be determined by using the following equation (1)'.

$$R = \min[V^2/Yg, f(\theta, V), V/(d\psi''/dt)] \tag{1'}$$

In this equation, f(θ, V) is a map of a turning radius which can be achieved steadily by the steering angle θ and turning speed V; ψ" is a yaw angular speed; and (dψ"/dt) is a yaw rate.

At step S5 following S4, controller 5 calculates an automatic brake start turning radius threshold Rs used as a threshold of the turning radius R to start the automatic brake operation in accordance with the current turning radius R. In this example, controller 5 first determines a limit turning radius $R_L$ (a limit of cornering performance) which enables safe turning motion with the current turning speed V, by using the following equation (2).

$$R_L = V^2/Yg_L \tag{2}$$

In this equation, $Yg_L$ is a limit lateral acceleration enabling safe turning motion.

Then, radius threshold Rs is determined by multiplying the limit turning radius $R_L$ by a predetermined coefficient h which is greater than one. In this example, h=1.1.

$$Rs = h \cdot R_L \tag{3}$$

In this example, coefficient h is set greater than one (h=1.1) to set the radius threshold Rs slightly greater than the limit turning radius $R_L$ and thereby to provide a margin in order to initiate the automatic brake operation before the actual turning radius R reaches the limit turning radius $R_L$, and before the tire grip is saturated.

At step S6 following S5, controller 5 calculates an automatic brake start turning speed threshold Vs used as a threshold of the turning speed V to start the automatic brake operation in accordance with the current turning speed V. In this example, controller 5 first determines a limit turning speed $V_L$ (a limit of cornering performance) which enables safe turning motion with the current turning radius R, by using the following equation (4). That is, limit turning speed $V_L$ is equal to the square root of $(R \cdot Yg_L)$.

$$V_L = \sqrt{(R \cdot Yg_L)} \tag{4}$$

Then, speed threshold Vs is determined by multiplying the limit turning speed $V_L$ by a predetermined coefficient k which is smaller than one. In this example, k=0.9.

$$Vs = k \cdot V_L \tag{5}$$

In this example, coefficient k is set smaller than one (k=0.9) to set the speed threshold Vs slightly smaller than $V_L$ and to provide a margin in order to initiate the automatic brake operation before the turning speed V reaches the limit turning speed $V_L$, and before the tire grip is saturated.

At next step S7, controller 5 examines whether the current turning radius R is smaller than its threshold Rs or the current turning speed V is higher than its threshold Vs. When at least one of the first condition (R<Rs) and the second condition (V>Vs) is met, the controller 5 proceeds to step S10 on the assumption that the vehicle turning state approaches the turning ability limit and the automatic braking is appropriate. If, on the other hand, the current turning radius R is greater than or equal to Rs (R≧Rs) and at the same time the current turning speed V is lower than or equal to Vs (V≦Vs), then controller 5 proceeds from S7 to S8 for the normal mode on the assumption that the vehicle turning state is not near the turning ability limit and the automatic braking is not necessary.

At S8, controller 5 sets the command braking force D* equal to driver's demand braking force Ddr (D*=Ddr). Then, at next step S9, controller 9 controls the actual braking force of the vehicle by controlling the hydraulic actuator 6 in the normal mode. After S9, controller 5 terminates the process of FIG. 2 and returns to a predetermined main program.

At S10 for the auto brake control mode, controller 5 calculates the desired target braking force Dcop (desired braking force for corner over-speed prevention) to ensure stable turning motion, in accordance with a deviation of turning radius R from the auto brake start threshold Rs, and a deviation of turning speed V from the auto brake start threshold Vs. In this example, target braking force Dcop is determined by using the following equation (6) in which Kc1 and Kc2 are target braking force gains.

$$Dcop = \max\left[\frac{V - Vs}{Kc1}, \frac{Rs - R}{R \cdot Rs \cdot Kc2}\right] \tag{6}$$

Then, controller 5 calculates a time rate of change (or change rate) dDcop/dt of the target braking force Dcop at step S11 following S10, and further calculates a time rate of change (or change rate) dDdr/dt of the driver's demand braking force Ddr at step S12. At step S13, controller 5 examines whether the change rate dDdr/dt of driver's demand braking force Ddr is greater than or equal to zero. When dDdr/dt<0, controller 5 considers that driver's brake pedal 4 is released, and proceeds to step S17. When dDdr/dt≧0, controller 5 considers that the brake pedal 4 is depressed further or held depressed by the driver, and proceeds to step S14.

At S14, controller 5 compares the target braking force Dcop with a previous command braking force D*(n−1) which is a value of the command braking force D* one sampling cycle before. When the command braking force D*(n−1) calculated in the most recent sampling or calculation cycle is smaller than the target braking force Dcop calculated at S10 of the current cycle (D*(n−1)<Dcop), controller 5 proceeds to step S15, and calculates the command braking force D*, in accordance with the time rate of change of the demand braking force Ddr and the time rate of change of the target braking force Dcop, according to the following equation (7). In this equation, $\Delta t$ is a sampling cycle time, $K_{BA}$ is a brake assist coefficient (in this example, $K_{BA}=1$)

$$D^* = D^*(n-1) + \max\left[\frac{dDdr}{dt} \cdot \Delta t \cdot K_{BA}, \frac{dDdr}{dt} \cdot \Delta t\right] \quad (7)$$

According to the equation (7), the command braking force D* is increased at an increase rate which is set equal to a greater one of the change rate dDcop/dt of target braking force Dcop (or the increase rate determined by the time rate of change of the target braking force) and the change rate dDdr/dt of demand braking force Ddr (or the increase rate-determined by the time rate of change of the demand braking force).

When, on the other hand, D*(n−1)>Dcop, controller 5 proceeds to step S16, and calculates the command braking force D* according to the following equation (8).

$$D^* = D^*(n-1) + \frac{dDdr}{dt} \cdot \Delta t \cdot K_{BA} \quad (8)$$

According to equation (8), the command braking force D* is increased at an increase rate which is set equal to the change rate dDdr/dt of driver's demand braking force Ddr.

When the braking pedal is being returned and hence dDdr/dt is smaller than zero, controller 5 proceeds from S13 to a step S17, and examines, at S17, whether the driver's brake operation quantity S is greater than or equal to a predetermined very small value So corresponding to a very small depression degree obtained when the driver merely rests a foot on the brake pedal. When S≧So, controller 5 proceeds to a step S18, and calculates the command braking force according to the following equation (9).

$$D^* = \max\left[\left(D^*(n-1) + \frac{dDdr}{dt} \cdot \Delta t \cdot \frac{D^*(n-1)}{\max[Ddr, 0.01]}\right), Dcop\right] \quad (9)$$

In this equation, the fraction D*(n−1)/max[Ddr, 0.01] represents the ratio (D*(n−1)/Ddr) of the command braking force D*(n−1), to the demand braking force Ddr, and the denominator max[Ddr, 0.01] includes a select-high operation between Ddr and 0.01, to prevent the denominator from becoming equal to zero when the demand braking force Ddr is zero. According to the equation (9), the command braking force D* is set equal to a greater one of target braking force Dcop and the quantity decreasing at the change rate dDdr/dt of demand braking force Ddr. The quantity decreasing at the change rate dDdr/dt of demand braking force Ddr is decreased at the decrease rate obtained by multiplying the change rate dDdr/dt by the ratio (D*(n−1)/Ddr) of the previous (most recent) command braking force D*(n−1) to the demand braking force Ddr. Therefore, the decrease rate of the command braking force becomes greater as the demand braking force Ddr becomes smaller as compared to D*(n−1).

When S<So, controller 5 proceeds from S17 to step S19, and calculates the command braking force D* according to the following equation (10).

$$D^* = \max[(D^*(n-1) - dDLim \cdot \Delta t), Dcop, Ddr] \quad (10)$$

In this equation, dDLim is a predetermined braking force decrease gradient (0.5 G/sec, in this example). According to the equation (10), the command braking force D* is set equal to a greater one of the target braking force Dcop, demand braking force Ddr, and the braking force decreasing at the predetermined decrease gradient DLim.

After the calculation of the command braking force D* at one of the command braking force calculating steps S15, S16, S18 and S19 in the brake control mode, controller 5 proceeds to step S20, and controls the actual braking force of the vehicle by driving the hydraulic actuator 6 in accordance with the calculated command braking force D* to achieve the calculated command braking force. At a next step S21, controller 5 performs an operation to control the throttle motor 7 so as to achieve an optimum engine output for the vehicle deceleration. After S21, controller 5 returns to the main program.

In this example, according to one of possible interpretations, S10 corresponds to target braking force calculating means; step S2 corresponds to demand braking force calculating means; S8, S15, S16, S18 and S19 correspond to command braking force calculating means; S11 corresponds to target braking force change rate calculating means; S12 corresponds to demand braking force change rate calculating section; and S9 and S20 and hydraulic actuator 6 correspond to actual braking force controlling means.

The thus-constructed brake control system according to the embodiment is operated as follows: When turning radius R is greater than or equal to radius threshold Rs, and at the same time the turning speed V is lower than or equal to speed threshold Vs, and the answer of S7 is NO, then the control system assumes that the vehicle maintains a stable cornering operation, and requires no automatic brake control assistance, and controls the hydraulic brake system 6 in the normal mode (at S8 and S9) to realize the driver's demand braking force Ddr corresponding to the driver's brake operation while holding the target braking force Dcop equal to zero.

If a driver's steering operation quantity is increased and the turning radius R becomes smaller than the threshold Rs or if a driver's accelerator operation quantity is increased and the vehicle turning speed V becomes higher than speed threshold Vs (in the case of Yes of S7), then the control system assumes that the vehicle turning state approaches the limit of the turning performance, and hence calculates the target braking force Dcop desirable for sustaining stable cornering performance and preventing an over-speed cornering operation, in accordance with the deviation of turning radius R from threshold Rs, and the deviation of turning speed V from threshold Vs (at S10). Then, the control system calculates the command braking force D* in the brake control mode within the range in which the command braking force D* does not become smaller than the target braking force Dcop. The control system then performs the automatic deceleration control for stable cornering operation, by controlling the hydraulic brake system 6 in accordance with the calculated command braking force D* and further controlling the throttle motor 7 (at S20 and S21). The control system terminates the automatic deceleration control when the actual vehicle turning condition is restored to the stable state in which the turning radius R is greater than or equal to Rs, and at the same time the turning speed V is lower than or equal to Vs.

Figure 3:
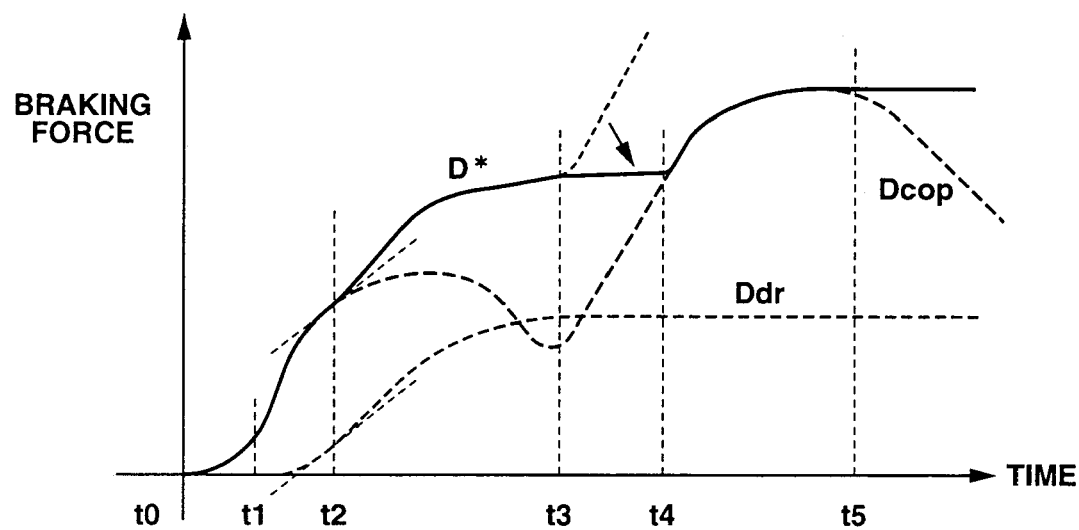
FIG. 3 is a time chart illustrating operations of the braking force control system of FIG. 1 when a brake pedal depression degree is increased.

When the driver depresses the brake pedal deeper and hence the answer of S13 becomes YES, then the control system calculates the command braking force D* in the following manner. When, as shown in FIG. 3, target braking force Dcop rises from zero at an instant t0 and the driver's demand braking force Ddr still remains zero; then the control system increases the command braking force D* in accordance with the increase rate dDcop/dt of target braking force by using the equation (7) since the increase rate of target braking force Dcop is greater than the increase rate dDdr/dt of demand braking force (S15). In this case, the command braking force D* is held equal to target braking force Dcop (D*=Dcop).

When the driver's brake operation starts at an instant t1, the driver's demand braking force Ddr rises from zero. However, the increase rate dDcop/dt of target braking force Dcop is still greater than the increase rate dDdr/dt of demand braking force. Therefore, the control system increases the command braking force D* in accordance with the increase rate dDcop/dt of target braking force according to the equation (7) as in the period between t0 and t1. When the increase rate dDdr/dt of demand braking force becomes greater than the increase rate of target braking force Dcop at t2; then the control system increases the command braking force D* in accordance with the increase rate dDdr/dt of demand braking force. Therefore, the command braking force D* is increased even if the target braking force Dcop is decreased. This control system can increase the vehicle deceleration securely in response to a further depression of the brake pedal by the driver, and can prevent unnatural feeling from being aroused in the driver depressing the brake pedal in expectation of an increase of the deceleration.

When, in this case, the command braking force D* (the previous command braking force D*(n−1) calculated in the most recent calculation cycle before the current cycle, to be exact) is greater than or equal to target braking force Dcop (calculated at S10 in the current calculation cycle), and hence the answer of S14 is NO; then the control system increases the command braking force D* in accordance with the increase rate dDdr/dt of demand braking force Ddr according to the equation (8) at S16, without regard to the increase rate of target braking force Dcop. If the increase rate dDcop/dt of target braking force Dcop becomes greater than the increase rate dDdr/dt of demand braking force Ddr at an instat t3, and the increase of command braking force is continued at the increase rate of target braking force according to equation (7); the command braking force D* is increased needlessly as shown by a broken line in FIG. 2 from t3. The control system according to the embodiment can avoid this needless increase of command braking force D*, by the calculation of command braking force D* according to equation (8) at S16. Target braking force Dcop is calculated as the magnitude of the braking force required to maintain a stable cornering operation. Therefore, the control system can ensure the stable cornering operation with no impairment as long as the command braking force D* is held in the range greater than or equal to the target braking force Dcop.

When the command braking force D* (the previous command braking force D*(n−1) calculated in the most recent calculation cycle before the current cycle, to be exact) becomes smaller than target braking force Dcop at an instant t4, the command braking force D* is increased again at the increase rate dDcop/dt according to equation (7) of S15, and the command braking force D* becomes equal to target braking force Dcop (D*=Dcop). From an instant t5, the increase rate dDdr/dt (equaling approximately zero) of demand braking force Ddr becomes greater than the increase rate dDcop/dt (negative) of target braking force Dcop. Therefore, the command braking force D is held in accordance with the increase rate dDdr/dt of demand braking force Ddr as shown by a solid line in FIG. 3 from t5.

Figure 4:
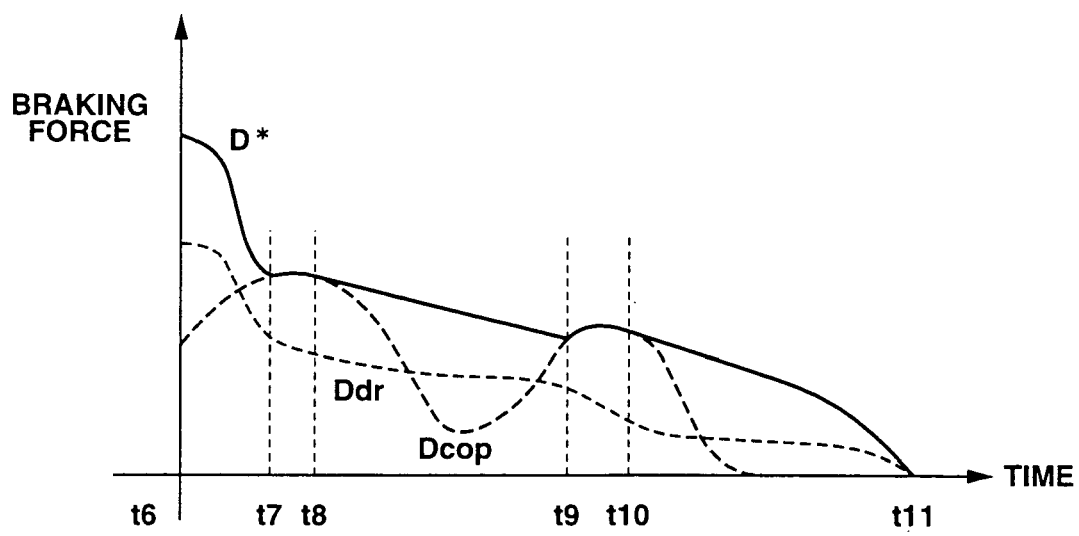
FIG. 4 is a time chart illustrating operations of the braking force control system of FIG. 1 when the brake pedal depression degree is decreased.

When the driver allows the brake pedal 4 to return toward the non-depressed position, and hence the answer of S13 is NO; the control system calculates command braking force D* in the following manner. When the driver loosens brake pedal 4 in the releasing direction, and the demand braking force Ddr is in a decreasing state as shown in FIG. 4, the control system calculates command braking force D* according to equation (9) at S18 by selecting a greater one of the quantity decreasing in accordance with the time rate of change dDdr/dt of demand braking force Ddr, and the target braking force Dcop. In the example of FIG. 4, the command braking force D* is determined, according to equation (9), by the quantity decreasing in accordance with the time rate of change dDdr/dt of demand braking force Ddr during a period of t6~t7, a period of t8~t9 and a period of t10~t11. During a period of t7~t8 and a period of t9~t10, the command braking force D* is determined by target braking force Dcop.

The quantity decreasing in accordance with the time rate of change dDdr/dt of demand braking force Ddr is arranged to decrease at the decrease rate which is equal to the product obtained by multiplying the decrease rate dDdr/dt of demand braking force Ddr, by the fraction (D*(n−1)/Ddr) whose numerator is equal to the previous command braking force D*(n−1) and whose denominator is equal to the demand braking force Ddr. With this multiplication by the fraction or ratio (D*(n−1)/Ddr), the control system decreases the command braking force D*, gradually toward the demand braking force Ddr, with the decrease rate greater than the decrease rate dDdr/dt of demand braking force Ddr. By so doing, the control system can reduce the command braking force D* reliably to zero when the driver's brake operation quantity S is reduced to zero, and thereby prevent the braking force from lingering.

Figure 5:
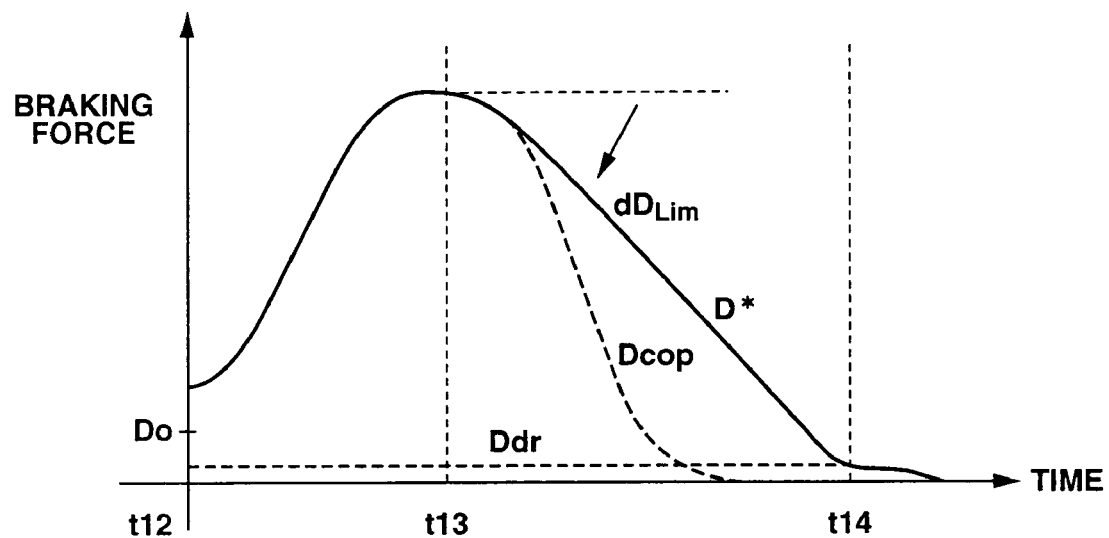
FIG. 5 is a time chart illustrating operations of the braking force control system of FIG. 1 when the brake pedal depression degree is very small.

When the brake operation quantity (or brake pedal depression degree) S is smaller than the very small value So which, in this example, represents the state in which driver's foot is lightly placed on brake pedal 4 (the answer of S17 is No), the control system calculates command braking force D* in the following manner. When driver's foot is merely placed on brake pedal 4, and the driver's demand braking force Ddr is smaller than a braking force Do produced by the brake operation quantity So, as shown in FIG. 5, the control system calculates command braking force D* according to equation (10) at S19, by using the greatest value among the quantity decreasing with the predetermined decrease rate dDlim, the target braking force Dcop and the demand braking force Ddr. In the example of FIG. 5, command braking force D* is set equal to target braking force Dcop during a period of t12~t13; equal to the quantity decreasing with the predetermined decrease rate dDlim during a period of t13~t14; and equal to demand braking force Ddr during a period after t14. The predetermined decrease rate or decrease gradient dDlim is set equal to such a value as to prevent an abrupt decrease of command braking force D* undesirable to the driver when the target braking force Dcop or demand braking force Ddr is reduced to zero. For example, the predetermined decrease rate or decrease gradient dDlim is set equal to a half of the decrease rate or gradient of target braking force Dcop, or equal to a value approximately equal to one half of the decrease rate of target braking force Dcop.

Therefore, from t13, though the time rate of change dDdr/dt of demand braking force Ddr (which is approximately equal to zero) is greater than the time rate of change dDcop/dt of target braking force Dcop (which is negative), the control system decreases the command braking force D*, as shown by a solid line in FIG. 5, at the predetermined decrease rate dDlim, and thereby prevents the command braking force D* from being held at a high level when the demand braking force Ddr is at such a level that driver's foot is lightly placed on brake pedal 4. When command braking force D* is decreased at predetermined decrease rate dDlim, the braking force might remain for a time after target braking force Dcop and demand braking force Ddr are both reduced to zero. This is effective for preventing the vehicle behavior from being made unstable by abrupt elimination of the braking force when the vehicle turning condition is restored to the stable region. If there arises undesired dragging feel of the brake, it is optional to increase the braking force decrease gradient dDlim in accordance with the accelerator pedal operation quantity, for example, to advance the elimination of the braking force.

In the illustrated practical example, the hydraulic brake actuating system 6 is employed. However, the present invention is not limited to this. It is operation to employ an electric brake system including one or more electric actuators arranged to produce a braking force by pressing a friction member onto a disk rotor; a regenerative brake system; or a brake system utilizing air resistance. The illustrated practical example employs a steer-by-wire system arranged to control the braking force of each wheel electronically in accordance with the driver's brake operation. However, the present invention is not limited to this. For example, it is optional to employ a hydraulic circuit connecting brake pedal 4 with each wheel cylinder as long as there are provided one or more actuators capable of control a braking force of a vehicle independent from a driver's brake operation.

In the illustrated practical example, driver's demand braking force Ddr is calculated from the driver's operation quantity (pedal depression degree) S of brake pedal 4. The present invention is not limited to this arrangement. For example, it is optional to calculate the driver's demand braking force Ddr from a master cylinder fluid pressured sensed by a pressure sensor.

In the illustrated practical example, the equations (7) and (8) use the demand braking force Ddr calculated from brake pedal operation quantity S. It is optional to increase a gain (such as a proportional gain) of the demand braking force Ddr to the brake operation quantity S when the demand braking force is in the increasing state, and at the same time the target braking force is greater than zero, as compared to a value of the gain used when the target braking force is zero. Moreover, it is optional to use a brake operation speed dS/dt, instead of the brake operation quantity S, and to increase the demand braking force Ddr as the brake pedal operation speed dS/dt becomes higher.

Figure 6:
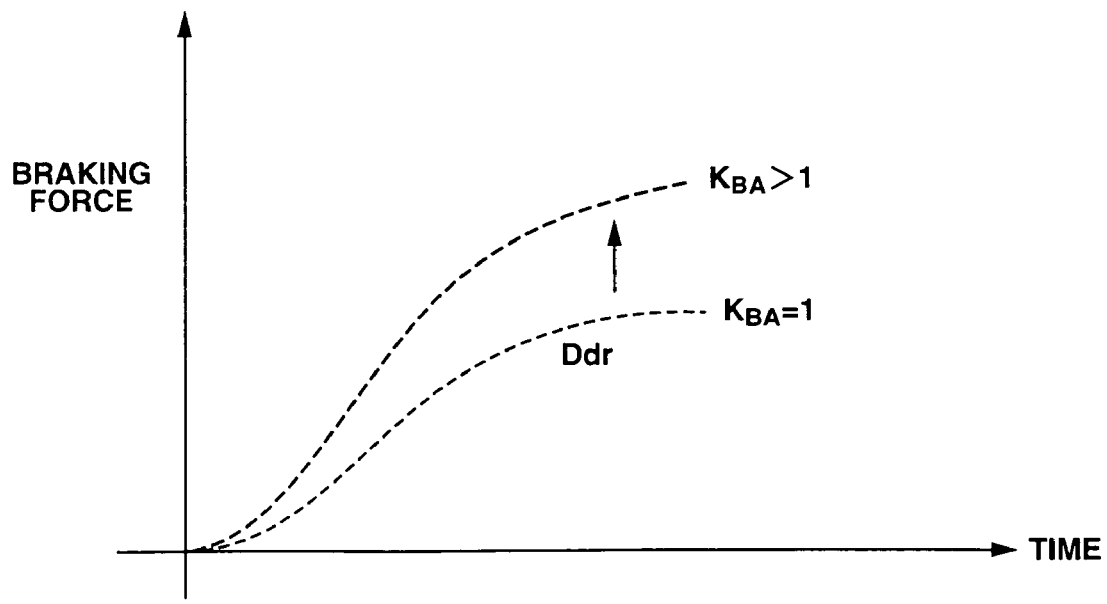
FIG. 6 is a graph showing the demand braking force Ddr when the increase rate is adjusted.

In the illustrated practical example, the brake assist coefficient $K_{BA}$ is set equal to one, in equations (7) and (8). However, the present invention is not limited to this. It is optional to increase or decrease the brake assist coefficient $K_{BA}$ slightly according to the need. For example, brake assist coefficient $K_{BA}$ is set equal to a value greater than one when the target braking force is greater than zero while $K_{BA}$ is zero when the target braking force is zero. In this case, the increase rate dDdr/dt of demand braking force Ddr is adjusted to a greater value, and therefore the control system can increase the command braking force D* more quickly and greatly, as shown in FIG. 6. Thus, the control system can decelerate the vehicle quickly and give assistance to a driver's brake operation to ensure a stable cornering operation.

In the illustrated practical example, the ratio D*(n−1)/max [Ddr, 0.01] is used as a coefficient for increasing the decrease rate dDdr/dt of demand braking force Ddr in equation (9). It is optional to adjust this ratio to a slightly greater value of a slightly smaller value.

In the illustrated practical example, the present invention is applied to an automatic brake control system, called corner automatic braking system, arranged to brake a vehicle automatically in accordance with a vehicle turning condition or a vehicle turning motion variable (such as the turning radius R and/or the vehicle turning speed V sensed by one or more sensors serving as a vehicle running condition sensor). However, the present invention is not limited to this. The present invention is applicable to various braking force control systems for controlling a vehicle braking force, even if a brake pedal is not depressed by a driver, when a predetermined vehicle running state is detected (such as an automatic brake control system, an adaptive cruise control system or a stability control system).

This application is based on a prior Japanese Patent Application No. 2004-167909 filed on Jun. 7, 2004. The entire contents of this Japanese Patent Application No. 2004-167909 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle brake control apparatus, comprising:
   a controller configured to control an actual braking force of a vehicle to achieve a command braking force, the controller being configured,
      to determine a driver's demand braking force corresponding to a driver's braking operation of the vehicle;
      to calculate a target braking force independent of the driver's braking operation, to control the actual braking force of the vehicle in a brake control mode in a predetermined vehicle running state;
      to calculate a time rate of change of the target braking force;
      to calculate a time rate of change of the demand braking force; and
      to calculate the command braking force in the control mode in accordance with the time rate of change of the demand braking force and the time rate of change of the target braking force;
   wherein the controller is configured:
      to calculate the command braking force so that the command braking force remains greater than or equal to the target braking force in the brake control mode in the predetermined vehicle running state, and
      to increase the command braking force at an increase rate determined by the time rate of change of the demand braking force if the demand braking force is in an increasing state, and the increase rate determined by the time rate of change of the demand braking force is greater than an increase rate determined by the time rate of change of the target braking force.

2. The vehicle brake control apparatus as claimed in claim 1, wherein the controller is configured to increase the command braking force at the increase rate determined by the time rate of change of the demand braking force when the command braking force is greater than the target braking force, even if the increase rate determined by the time rate of change of the demand braking force is smaller than the increase rate determined by the time rate of change of the target braking force.

3. The vehicle brake control apparatus as claimed in claim 1, wherein the controller is configured to control the actual braking force of the vehicle in a normal mode in accordance with the demand braking force when the predetermined vehicle running state is not detected; and to increase the actual braking force of the vehicle in the brake control mode by increasing the command braking force at an increase rate greater than the time rate of change of the demand braking force when the predetermined vehicle running state is detected.

4. The vehicle brake control apparatus as claimed in claim 1, wherein the controller is configured to decrease the command braking force at a decrease rate greater than a decrease rate determined by the time rate of change of the demand braking force when the command braking force is greater than the target braking force, and the demand braking force is in a decreasing state.

5. The vehicle brake control apparatus as claimed in claim 1, wherein the controller is configured to decrease the command braking force at a decrease rate greater than a decrease rate determined by the time rate of change of the demand braking force when the command braking force is greater than the target braking force and greater than the demand braking force, and the demand braking force is in a decreasing state within a small demand braking force region.

6. The vehicle brake control apparatus as claimed in claim 1, wherein the controller is configured to calculate the target braking force only when the predetermined vehicle running state is detected; and the controller is configured to calculate the command braking force within a range greater than or equal to the target braking force in the brake control mode, and to calculate the command braking force by using a previous value of the command braking force calculated in a previous calculation cycle, and the time rate of change of the demand braking force if the demand braking force is in the increasing state, and an increase rate of the demand braking force is greater than an increase rate of the target braking force.

7. A vehicle brake control apparatus, comprising:
a controller configured to control an actual braking force of a vehicle to achieve a command braking force, the controller being configured,
to determine a driver's demand braking force corresponding to a driver's braking operation of the vehicle;
to calculate a target braking force independent of the driver's braking operation, to control the actual braking force of the vehicle in a brake control mode in a predetermined vehicle running state;
to calculate a time rate of change of the target braking force;
to calculate a time rate of change of the demand braking force; and
to calculate the command braking force in the control mode in accordance with the time rate of change of the demand braking force and the time rate of change of the target braking force;

wherein the controller is configured to increase the command braking force at an increase rate which is calculated from the time rate of change of the demand braking force and which is greater than the time rate of change of the target braking force when the demand braking force is increased.

8. The vehicle brake control apparatus as claimed in claim 7, wherein the controller is configured to increase the command braking force at an increase rate which is set equal to a greater one of a first rate proportional to the time rate of change of the demand braking force and a second rate proportional to the time rate of change of the target braking force.

9. The vehicle brake control apparatus as claimed in claim 7, wherein the controller is configured to increase the command braking force at an increase rate which is calculated from the time rate of change of the demand braking force without regard to the time rate of change of the target braking force when the demand braking force is increased, and the command braking force is greater than the target braking force.

10. The vehicle brake control apparatus as claimed in claim 7, wherein the controller is configured to decrease the command braking force at a decrease rate determined by the time rate of change of the demand braking force, as long as the command braking force is equal to or greater than the target braking force, when the demand braking force is decreased in the brake control mode.

11. The vehicle brake control apparatus as claimed in claim 7, wherein the controller is configured to decrease the command braking force at a predetermined decrease rate, as long as the command braking force is not decreased below the target braking force and the demand braking force, when the demand braking force is decreased and a driver's brake operation quantity is smaller than a predetermined value.

12. A vehicle brake control process of controlling an actual braking force of a vehicle, the vehicle brake control process comprising:
controlling the actual braking force of the vehicle to achieve a command braking force;
calculating a driver's demand braking force in accordance with a sensed driver's brake operation quantity;
calculating a target braking force for an automatic brake control when a predetermined running state is present;
calculating a time rate of change of the demand braking force;
calculating a time rate of change of the target braking force;
calculating the command braking force in accordance with the time rate of change of the demand braking force, and the time rate of change of the target braking force;
calculating the command braking force so that the command braking force remains greater than or equal to the target braking force in a brake control mode in the predetermined vehicle running state, and
increasing the command braking force at an increase rate determined by the time rate of change of the demand braking force if the demand braking force is in an increasing state, and the increase rate determined by the time rate of change of the demand braking force is greater than an increase rate determined by the time rate of change of the target braking force.

* * * * *